United States Patent [19]
Eckel, Jr. et al.

[11] Patent Number: 5,790,326
[45] Date of Patent: Aug. 4, 1998

[54] INFRARED ENERGY DETECTION SYSTEM

[75] Inventors: Robert A. Eckel, Jr., Andover; Samuel Menasha, Chelmsford, both of Mass.

[73] Assignee: Raytheon Company, Lexington, Mass.

[21] Appl. No.: 775,062

[22] Filed: Dec. 27, 1996

[51] Int. Cl.⁶ .................................................. G02B 7/02
[52] U.S. Cl. ........................ 359/823; 359/822; 359/819; 359/826
[58] Field of Search ................................. 359/823, 822, 359/819, 826

[56] References Cited

U.S. PATENT DOCUMENTS

| | | | |
|---|---|---|---|
| 4,304,463 | 12/1981 | Tomori | 359/829 |
| 5,299,067 | 3/1994 | Kutz et al. | 359/829 |

Primary Examiner—Frank G. Font
Assistant Examiner—Reginald A. Ratiff
Attorney, Agent, or Firm—Fish & Richardson P.C.

[57] ABSTRACT

An infrared energy detection system having an infrared detector and a cooling system including a fluid coolant for cooling the infrared detector. An optical system is provided for directing infrared energy from a target to the detector though an optical system. The optical system includes a housing having a plurality of stops, each one of the stops corresponding to one of a plurality of fields of view of the optical system. A first lens is fixed within the housing. A second lens is slidably mounted within the housing and engageable by the plurality of stops. The second lens has a first resting position when engaging a first one of the stops. A fluid actuator system is provided for sliding the second lens away from the first stop to a second resting position when engaging the second stop.

15 Claims, 2 Drawing Sheets

INFRARED ENERGY DETECTION SYSTEM

BACKGROUND OF THE INVENTION

This invention relates generally to infrared energy detection systems and more particularly to infrared energy detection system adapted for use in missile seekers and adapted to provide a plurality of different fields of view.

As is known in the art, infrared missile seekers include an optical system disposed in front of an infrared detector for focusing infrared energy from a target onto the detector. In some systems, the optical system is required to have a different field of view in different phases of the missile's flight. Typical optical field of view switching mechanisms require complex electromechanical assemblies to change the position of one lens assembly relative to another lens assembly and thereby change the view of the optical system. These electromechanical assemblies are typically rods and electromechanical drivers, worm mechanisms and electromechanical drivers, or gears and electromechanical drivers. These mechanisms also require a relatively complex feedback loop for lens positioning in order to reduce the effect part tolerances and hysteresis. That is, for the same commanded position, feedback is needed so that the lens return to the same position. Still further, the electromechanical system are relatively large, require relatively large amounts of power for their operation and require some method for dissipating such power. Further, temperature effects on the mechanism may change the position actually achieved by the system in its operational environment. In a missile application, temperature may vary over an extremely wide range.

SUMMARY OF THE INVENTION

In accordance with the present invention, an optical system includes a housing having a plurality of stops. Each one of the stops corresponds to one of a plurality of fields of view of the optical system. A first lens is fixed to the housing. A second lens is slidably mounted within the housing and engageable by the plurality of stops. The second lens has a first resting position when engaging a first one of the stops to provide the optical system with a first field of view. A fluid actuator system is provided for sliding the second lens away from the first stop to a second resting position when engaging the second stop to provide the optical system with a second field of view.

With such arrangement, the system is an open loop (i.e., non-feedback) system having fixed, or hard, stops each having been set, a priori, at the factory to correspond to one of a plurality of fields of view required by the optical system. Thus, the system accurately achieves a selected one of the plurality of, a priori, determined discrete fields of view. Further, with such an arrangement, the field of view can be changed in milliseconds, as contrasted with typically of 0.5 seconds required to change fields of view with a feedback arrangement, because of the pressures achievable with the fluid actuator are able to rapidly force the second lens against the stops.

In a preferred embodiment, the optical system includes a housing having a predetermined plurality of discrete laterally spaced stops. A first lens is fixed to the housing. A field of view changer mechanism is slidable mounted with the housing and engageable by the plurality of discrete stops. A second lens is affixed to the field of view changer mechanism and optically aligned with the first lens to provide the optical system with a different one of a plurality of fields of view when the field of view changer is engaging a corresponding one of the plurality of stops. A drive mechanism is coupled to the field of view changer. The drive mechanism includes a reservoir; a fluid disposed in the reservoir; and a valve. The valve has: an input port coupled to the reservoir; a first output port coupled to the drive mechanism; a second output port; and an actuator system, responsive to a control signal. The valve either: (a) couples the fluid in the reservoir through the input port to the first output port while decoupling the first output port from the second output port; or, (b) couples the first output port to the second output port while preventing the fluid from passing from the reservoir to either the first output port or the second output ports, selectively in accordance with the control signal.

The housing includes: a ring shaped cylinder having a forwardly disposed inlet coupled to the first output port of the valve. A first one of the stops is disposed forward of a second one of the stops. The drive mechanism includes a ring shaped piston slidably disposed within the ring shaped cylinder. The piston is coupled to the second lens and has a forward surface adapted to respond to fluid introduced into the cylinder through the inlet when the value couples the fluid in the reservoir to the first output port to slide the piston forward. A ring shaped spring is provided having a forward end disposed to engage a forward portion of the piston and a rearward end disposed adjacent the second one of the stops. The spring is configured to: (a) urge the piston rearward against the first one of the stops when in an expanded condition with the first output port coupled to the second output port while the fluid is prevented from passing from the reservoir to either the first output port or the second output ports; and (b) compress when the fluid is introduced into the cylinder from the reservoir, though the input port and out the output port of the valve into the inlet of the cylinder to force the piston forward and engage the second one of the plurality of stops. The first and second lenses are disposed along an optic axis. The housing is annular shaped. The housing, piston, cylinder and spring have center regions disposed along the optic axis to enable energy introduced to the optical system to pass into a forward portion of the housing, pass through the first and second lenses and the center regions of the piston, cylinder and spring ring and then exit the optical system through a rearward portion of the housing.

BRIEF DESCRIPTION OF THE DRAWINGS

Other features of the invention, as well as the invention itself, will become more readily apparent from the following detailed description taken together with the accompanying drawings, in which.

DESCRIPTION OF THE PREFERRED EMBODIMENTS

Figure 1A:
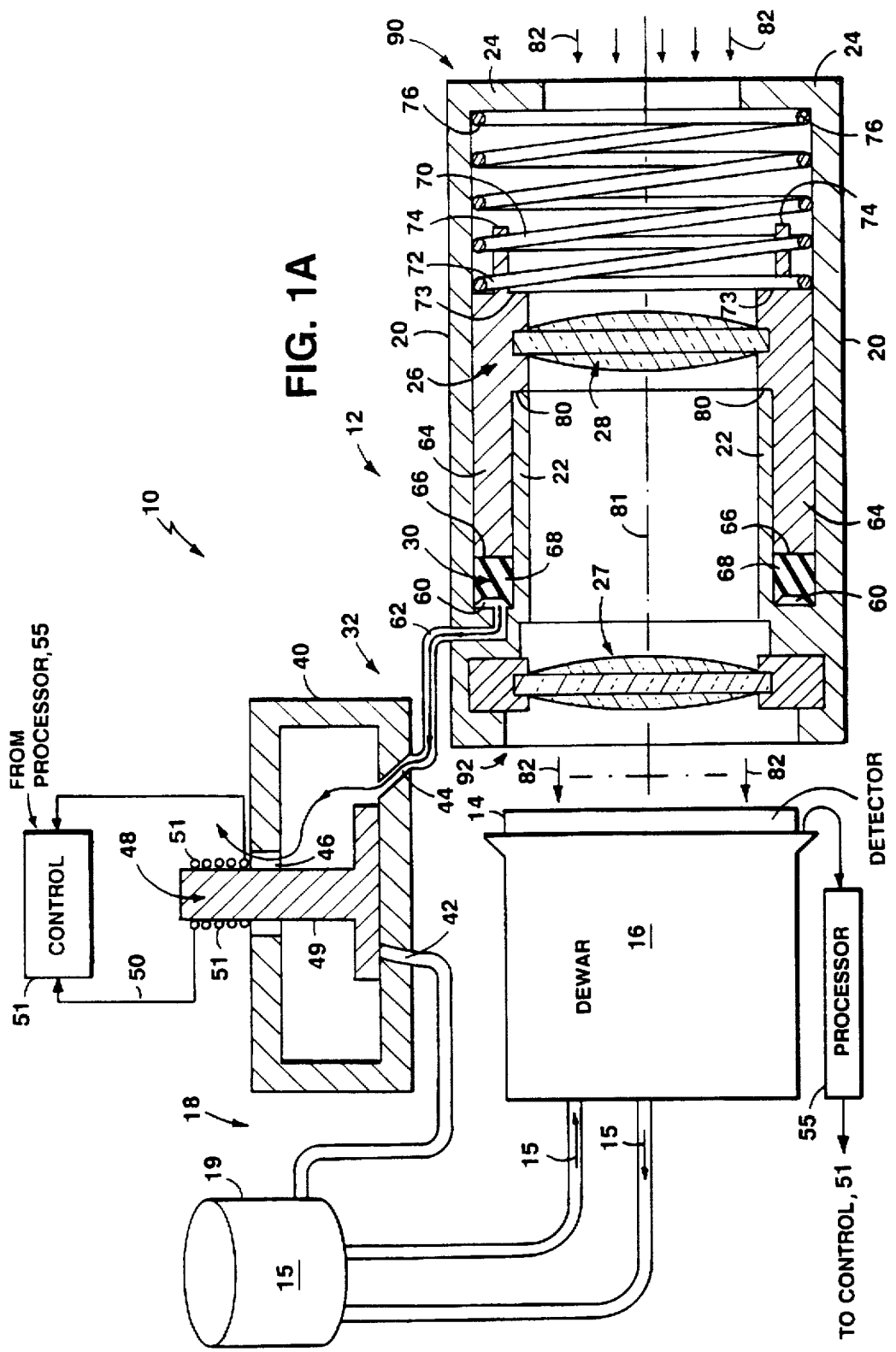
FIG. 1A is a diagrammatical sketch an infrared energy detection system having an optical system according to the invention with such system shown to provide a selected one of two fields of view.
Figure 1B:
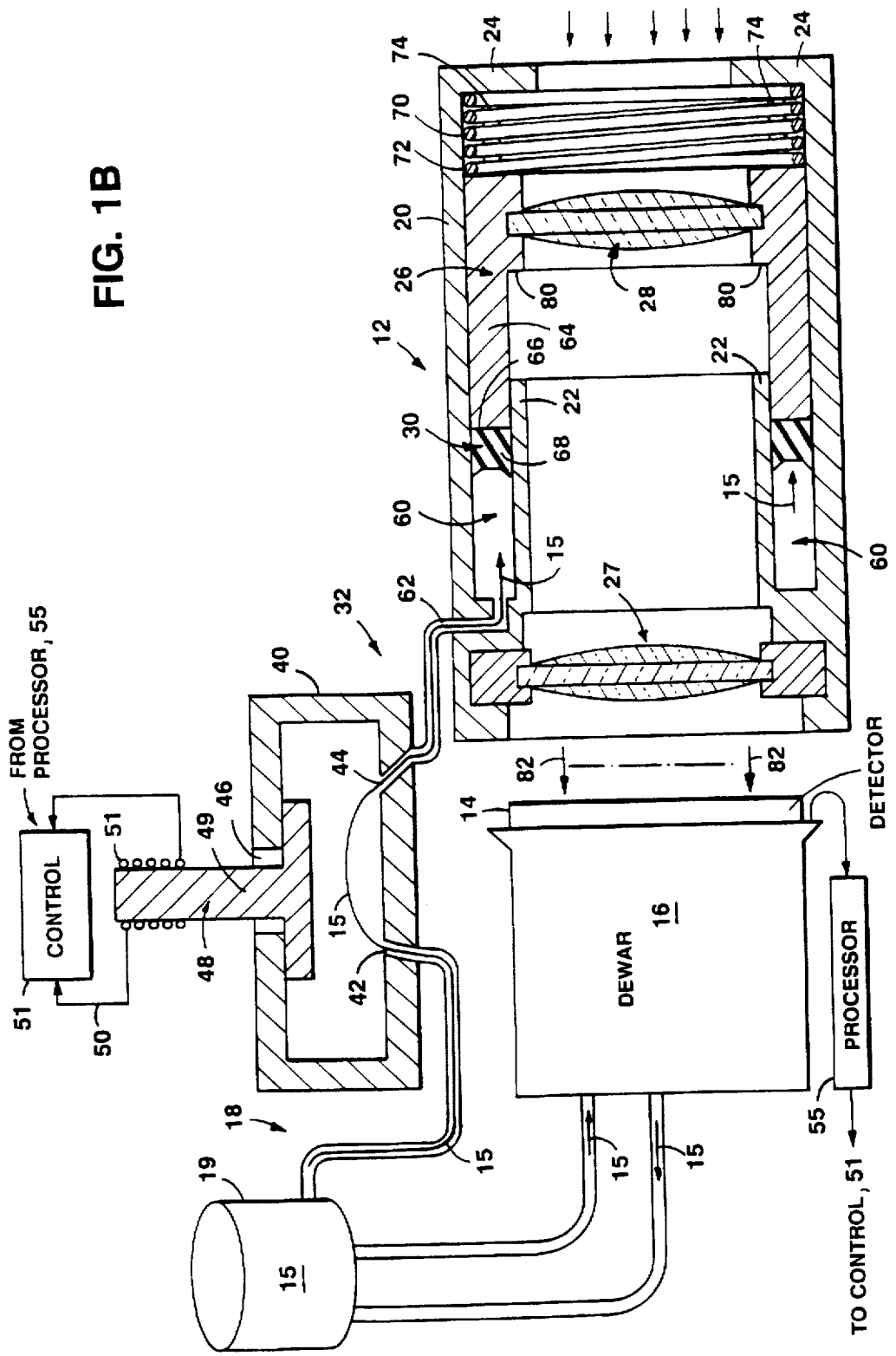
FIG. 1B is a diagrammatical sketch of the infrared energy detection system of FIG. 1A with the optical system thereof shown to provide a second one of the two fields of view.

Referring now to FIGS. 1A and 1B, an infrared energy detection system 10 is shown having an optical system 12 disposed in front of an infrared detector 14 for focusing infrared energy from an object, not shown, entering a forward end of the optical system onto to the detector 14 disposed at the rearward end of the optical system 12. The infrared detector 14 here is a focal plane array of infrared detectors coupled to a dewar 16 and a cooling system 18 to cryogenically cool the array of detectors 14. The cooling is supplied in a conventional manner by a suitable fluid 15, here nitrogen or argon, stored in a reservoir 19, as shown.

The optical system 12 includes a housing 20 having a predetermined plurality of stops, here two stops 22, 24. Each one of the stops 22, 24 corresponds to one of a discrete plurality of, here two, fields of view of the optical system 12. A lens assembly 26 is slidably mounted within the housing 20 and engageable by the plurality of stops 22, 24. The lens assembly 26 has a lens 28, here a single lens, affixed to it. The lens assembly 26 has a first resting position, shown in FIG. 1A when engaging a first one of the stops, here stop 22. A drive mechanism 30, here a fluid, more particularly a pneumatic, actuator system, is provided for sliding the lens assembly 26 away from the first stop 22, here forward, to a second resting position when engaging the second stop 24. Thus, the optical system 12 is an open loop (i.e., non-feedback) system and each one of the fixed, or hard, stops 22, 24 has been set, a priori, at the factory to correspond to one of a plurality of, here two, fields of view required by the optical system 12. Thus, the optical system 12 thereby accurately achieves a selected one of the plurality of, here two, a priori, determined discrete fields of view.

More particularly, the optical system 12 includes the lens 27, here a set of lenses, fixed to the housing 20. A field of view changer 32 is coupled to the drive mechanism 30 and includes: the reservoir 19 with the fluid 15, here the coolant, disposed in the reservoir 19 to also cool detector 14; and, a solenoid valve 40. The valve 40 includes: an input port 42 coupled to the reservoir 19; a first output port 44 coupled to the drive mechanism 30; a second output port 46; and an actuator system 48, here a plunger 49 and coil 51 wrapped around the stem of the plunger 49, as shown. The actuator system 48 is responsive to a control signal from control 51 on line 50. The current on line 50 is fed to the coil 51 in one of two directions. More particularly, the valve 40 either: (a) drives the plunger 49 downward, as shown in FIG. 1A, to couple the first output port 44 to the second output port 46 while a portion of the bottom of plunger blocks input port 42 to prevent the fluid 15 from passing from the reservoir 19 to either the first output port 44 or the second output port 48; or, alternatively, (b) drive the plunger upward, as shown in FIG. 1B, to couple the fluid 15 in the reservoir 19 through the input port 42 to the first output port 44 while decoupling the first output port 42 from the second output port 44, selectively in accordance with the control signal on line 50 produced by control 53. The control 51 is itself controlled by a processor 55 fed by signals produced, inter alia, by the detector 14.

The housing 20 is annular shaped and includes a ring shaped cylinder 60, shown more clearly in FIG. 1B, having a rearwardly disposed inlet 62 coupled to the first output port 44 of the valve 42. The drive mechanism 30 includes a ring shaped piston 64 slidably disposed within the ring shaped cylinder 60. The piston 64 is connected to the lens assembly 28, as described, and has a rearward surface 66 adapted to respond to the fluid 15 when such fluid 15 is introduced into the cylinder 60 through the inlet 62 (i.e., when the valve 42 couples the fluid 15 in the reservoir 19 to the first output port 44), as shown in FIG. 1B. It is noted that a seal 68 is mounted, or seated, to the rearward surface 66 of the piston 64, as shown.

The drive mechanism 30 also includes a ring shaped, helical spring 70 having a rearward end 72 disposed to engage portion 73 of piston 64 and a forward end 76 disposed adjacent, here engaging, the second one of the stops 24. It is noted that forward of portion 73, the piston 64 has a reduced diameter forward end 74 disposed within and encircled by the central rearward portion of the spring 70. The spring 70 is configured to: (a) urge the piston 64 rearward so that surface 80, shown more clearly in FIG. 1B, of piston 64 is forced against the first one of the stops 22 when the spring 70 is in an expanded condition, as shown in FIG. 1A; that is, with the first output port 44 is coupled to the second output port 46 to vent, or exhaust, via inlet 62 (now serving as an outlet from the cylinder 60) fluid 15 which may have been in the cylinder 60; and alternatively (b) compress, as shown in FIG. 1B, when the fluid 15 is introduced into the cylinder 60 to force the piston 64 forward so that the forward surface of forward end 74 of piston 64 engages the second one of the plurality of stops 24.

It is first noted that when the piston 64 is forced against the first stop 22, (FIG. 1A) the lenses 27, 28 provide the optical system 12 with a first field of view, as shown in FIG. 1A. It is next noted that when the piston 64 is forced against the second stop 24, the lenses 27, 28 provide the optical system 12 with the second field of view, as shown in FIG. 1B. It is also noted that when the piston 64 is being urged against the first stop 22, the fluid 15 is prevented by the actuator 48 (i.e., valve 40) in response to the control signal on line 50 from passing from the reservoir 19 to either the first output port 44 or the second output port 46.

The lenses 27, 28 are disposed along an optic axis 81. The housing 20, as noted above, is annular shaped. The housing 20, piston 64, cylinder 60 and spring 70 have center regions disposed along the optic axis 81 to enable infrared energy, represented by arrows 82, introduced to the optical system 12 to pass into a forward portion 90 of the housing 12, pass through the lenses 27, 28 and the center regions of the piston 64, cylinder 60 and spring 70 and then exit the optical system 12 through a forward portion 92 of the housing 12 onto detector 14.

Other embodiments are within the spirit and scope of the appended claims. For example, detents may be used for the stops enabling more than two fields of views. Further, the stops may be releasable stops. That is, the stops may be released by control mechanism, thereby again enabling more than two fields of views. Further, instead of using one ring-shaped spring, a plurality of smaller springs may be disposed circumferentially about the forward end of the piston. Still further, the forward lens may be affixed to the housing in which case the rearward lens would be movable with respect to the housing.

What is claimed is:

1. An optical system comprising:

a housing having a plurality of stops;

a first lens fixed to the housing;

a second lens slidably mounted within the housing and engageable by the plurality of stops, such second lens having a first resting position when engaging a first one of the stops; and a fluid actuator system for sliding the second lens away from the first stop to a second resting position when engaging the second stop.

2. An optical system comprising:

a housing having a predetermined plurality of stops, each one of the stops corresponding to one of a discrete plurality of field of view of the optical system;

a first lens fixed to the housing;

a lens assembly slidably mounted within the housing and engageable by the plurality of stops, such lens assembly having second lens affixed thereto, such lens assembly having a first position when engaging a first one of the stops to provide the optical system with a first field of view; and a fluid actuator system for sliding the lens assembly away from the first stop to a second position when engaging the second stop to provide the optical system with a second field of view.

3. The optical system recited in claim 2 wherein the fluid actuator system is a pneumatic actuator system.

4. An optical system comprising:

a housing having a predetermined plurality of discrete laterally spaced stops;

a first lens fixed to the housing;

a field of view changer mechanism slidable mounted within the housing and engageable by the plurality of discrete stops, comprising a second lens affixed to the field of view changer mechanism, optically aligned with the first lens to provide the optical system with a different one of a plurality of fields of view when the field of view changer engages a corresponding one of the plurality of discrete stops;

a drive mechanism coupled to the field of view changer, such drive mechanism comprising:

a reservoir;

a fluid disposed in the reservoir;

a valve having: an input port coupled to the reservoir; a first output port coupled to the drive mechanism; a second output port; and an actuator system, responsive to a control signal, for either: (a) coupling the fluid in the reservoir through the input port to the first output port while decoupling the first output port from the second output port; or, (b) coupling the first output port to the second output port while preventing the fluid from passing from the reservoir to either the first output port or the second output ports, selectively in accordance with the control signal.

5. The optical system recited in claim 4 wherein the housing includes:

a ring shaped cylinder having a forwardly disposed inlet coupled to the first output port of the valve; and wherein a first one of the stops is disposed the adjacent the inlet.

6. The optical system recited in claim 5 wherein the drive mechanism includes:

a ring shaped piston slidably disposed within the ring shaped cylinder, such piston being coupled to the second lens and having a rearward surface adapted to respond to fluid introduced into the cylinder through the inlet when the value couples the fluid in the reservoir to the first output port; and a ring shaped spring having a rearward end disposed to engage a forward portion of the piston and a forward end disposed adjacent a second one of the stops, such spring being configured to: (a) urge the piston rearward against the first one of the stops when in an expanded condition with the first output port coupled to the second output port while the fluid is prevented from passing from the reservoir to either the first output port or the second output ports; and (b) compress when the fluid is introduced into the cylinder though the input and first output ports of the valve into the cylinder inlet to force the piston forward and engage the second one of the plurality of stops.

7. The system recited in claim 6 wherein the first and second lens are disposed along an optic axis, the housing is annular shaped and wherein the housing, piston, cylinder and spring have center regions disposed along the optic axis to enable energy introduced to the optical system to pass into a forward portion of the housing, pass through the first and second lenses and the center regions of the piston, cylinder and spring and then exit the optical system through a forward portion of the housing.

8. The system recited in claim 7 wherein the valve comprises a solenoid valve.

9. An infrared energy detection system, comprising:

an infrared detector;

a cooling system including a fluid coolant for cooling the infrared detector;

an optical system for focusing infrared energy from a target onto to the detector, such optical system comprising:

a housing having a plurality of stops;

a first lens fixed to the housing;

a second lens slidably mounted within the housing and engageable by the plurality of stops, such second lens having a first resting position when engaging a first one of the stops; and a fluid actuator system fed by the coolant for sliding the second lens away from the first stop to a second resting position when engaging the second stop.

10. An infrared energy detection system, comprising:

an infrared detector;

a cooling system including a fluid coolant for cooling the infrared detector;

an optical system comprising:

a housing having a predetermined plurality of discrete laterally spaced stops;

a first lens fixed to the housing;

a field of view changer mechanism, coupled to the coolant, slidable mounted with the housing and engageable by the plurality of discrete stops, comprising:

a second lens affixed to the field of view changer mechanism, optically aligned with the first lens to provide the optical system with a different one of a plurality of fields of view when the field of view changer engages a corresponding one of the plurality of discrete stops.

11. The infrared detection system recited in claim 10 including:

a drive mechanism coupled to the field of view changer, such drive mechanism comprising:

a reservoir for storing the coolant;

a valve having: an input port coupled to the reservoir; a first output port coupled to the drive mechanism; a second output port; and an actuator system, responsive to a control signal, for either: (a) coupling the coolant in the reservoir through the input port to the first output port while decoupling the first output port from the second output port; or, (b) coupling the first output port to the second output port while preventing the coolant from passing from the reservoir to either the first output port or the second output ports, selectively in accordance with the control signal.

12. The infrared detection system recited in claim 11 wherein the housing includes:

a ring shaped cylinder having a forwardly disposed inlet coupled to the first output port of the valve; and wherein a first one of the stops is disposed the adjacent the inlet.

13. The infrared detection system recited in claim 12 wherein the drive mechanism includes:
- a ring shaped piston slidably disposed within the ring shaped cylinder, such piston being coupled to the second lens and having a rearward surface adapted to respond to coolant introduced into the cylinder through the inlet when the value couples the coolant in the reservoir to the first output port; and
- a ring shaped spring having a rearward end disposed to engage a forward portion of the piston and a forward end disposed adjacent a second one of the stops, such spring being configured to: (a) urge the piston rearward against the first one of the stops when in an expanded condition with the first output port coupled to the second output port while the coolant is prevented from passing from the reservoir to either the first output port or the second output ports; and (b) compress when the coolant is introduced into the cylinder though the input and first output ports of the valve into the cylinder inlet to force the piston forward and engage the second one of the plurality of stops.

14. The system recited in claim 12 wherein the first and second lens are disposed along an optic axis, the housing is annular shaped and wherein the housing, piston, cylinder and spring have center regions disposed along the optic axis to enable energy introduced to the optical system to pass into a forward portion of the housing, pass through the first and second lenses and the center regions of the piston, cylinder and spring and then exit the optical system through a rearward portion of the housing.

15. The system recited in claim 14 wherein the valve comprises a solenoid valve.

* * * * *